(12) United States Patent
McGuinness et al.

(10) Patent No.: US 11,728,090 B2
(45) Date of Patent: Aug. 15, 2023

(54) MICRO-SCALE DEVICE WITH FLOATING CONDUCTIVE LAYER

(71) Applicant: Analog Devices International Unlimited Company, Limerick (IE)

(72) Inventors: Patrick M. McGuinness, Limerick (IE); Paul Lambkin, Limerick (IE); Laurence B. O'Sullivan, Limerick (IE); Bernard Patrick Stenson, Limerick (IE); Steven Tanghe, Limerick (IE); Baoxing Chen, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 526 days.

(21) Appl. No.: 16/786,928

(22) Filed: Feb. 10, 2020

(65) Prior Publication Data
US 2021/0249185 A1    Aug. 12, 2021

(51) Int. Cl.
| | | |
|---|---|---|
| *H01F 27/36* | (2006.01) | |
| *H01F 27/28* | (2006.01) | |
| *H01G 4/30* | (2006.01) | |
| *H01G 4/012* | (2006.01) | |
| *H01F 27/32* | (2006.01) | |

(52) U.S. Cl.
CPC ......... *H01F 27/36* (2013.01); *H01F 27/2804* (2013.01); *H01F 27/323* (2013.01); *H01G 4/012* (2013.01); *H01G 4/30* (2013.01); *H01F 2027/2809* (2013.01)

(58) Field of Classification Search
CPC .... H01F 27/2804; H01F 27/323; H01F 27/36; H01F 27/40; H01F 2027/2809; H01G 4/012; H01G 4/30
See application file for complete search history.

(56) References Cited

U.S. PATENT DOCUMENTS

| | | |
|---|---|---|
| 3,549,825 A | 12/1970 | Trimble et al. |
| 4,914,561 A | 4/1990 | Rice et al. |

(Continued)

FOREIGN PATENT DOCUMENTS

| | | |
|---|---|---|
| CN | 106024340 A | 10/2016 |
| DE | 10 2004 036139 A1 | 3/2006 |

(Continued)

OTHER PUBLICATIONS

Cheung et al., Shielded Passive Devices for Silicon-Based Monolithic Microwave and Millimeter-Wave Integrated Circuits. IEEE Journal of Solid-State Circuits. May 2006; 41(5): 1183-1200.

(Continued)

*Primary Examiner* — Hoa C Nguyen
(74) *Attorney, Agent, or Firm* — Wolf, Greenfield & Sacks, P.C.

(57) ABSTRACT

Micro-scale devices, such as transformers and capacitors, having a floating conductive layer are disclosed. A floating conductive layer may be disposed in an insulator layer and can reduce a maximum electric field between a first planar conductor and a second planar conductor of a micro-scale passive device. Reduction of a maximum electric field between a first planar conductor and a second planar conductor can reduce undesirable effects on electrical components.

20 Claims, 9 Drawing Sheets

(56) References Cited

U.S. PATENT DOCUMENTS

| | | | |
|---|---|---|---|
| 5,598,327 | A | 1/1997 | Someville et al. |
| 5,781,077 | A | 7/1998 | Leitch et al. |
| 6,291,907 | B1 | 9/2001 | Haigh et al. |
| 6,420,952 | B1 | 7/2002 | Redilla |
| 6,882,263 | B2 | 4/2005 | Yang et al. |
| 7,042,325 | B2 | 5/2006 | Giandalia et al. |
| 7,474,190 | B2 | 1/2009 | Strzalkowski et al. |
| 7,622,887 | B2 | 11/2009 | Yoshimura |
| 7,646,305 | B2 | 1/2010 | Cote et al. |
| 7,994,890 | B2 | 8/2011 | Edo et al. |
| 8,238,074 | B2 | 8/2012 | Steeneken |
| 8,269,594 | B2 | 9/2012 | Yoshimura et al. |
| 8,288,894 | B2 | 10/2012 | Yoshimura |
| 9,236,171 | B2 | 1/2016 | Ito et al. |
| 9,391,016 | B2 | 7/2016 | Shen et al. |
| 9,793,203 | B2 * | 10/2017 | Tao ............... H01L 23/5223 |
| 9,929,038 | B2 | 3/2018 | O'Sullivan |
| 10,074,713 | B1 * | 9/2018 | Briano ............... H01L 25/18 |
| 2005/0128038 | A1 | 6/2005 | Hyvonen |
| 2006/0028313 | A1 | 2/2006 | Strzalkowski et al. |
| 2010/0157505 | A1 * | 6/2010 | Feichtinger ............ H01G 4/40 |
| | | | 361/301.4 |
| 2011/0241160 | A1 | 10/2011 | Kerber et al. |
| 2014/0252533 | A1 | 9/2014 | O'Sullivan |
| 2016/0152794 | A1 | 6/2016 | Diaham et al. |
| 2018/0130867 | A1 | 5/2018 | Lambkin et al. |
| 2019/0206981 | A1 * | 7/2019 | Bonifield ............... H01G 4/012 |
| 2020/0343037 | A1 | 10/2020 | Chen et al. |

FOREIGN PATENT DOCUMENTS

| | | |
|---|---|---|
| DE | 10 2011 006 454 A1 | 10/2011 |
| EP | 1 420 420 A2 | 5/2004 |
| EP | 1 855 297 A1 | 11/2007 |
| EP | 3 020 050 A1 | 5/2016 |
| FR | 3 008 223 A1 | 1/2015 |
| JP | 2016-531972 A | 10/2016 |
| WO | WO 98/50956 A1 | 11/1998 |
| WO | WO 2015/004115 A1 | 1/2015 |

OTHER PUBLICATIONS

Islam, Advanced Interfacing Techniques for the Capacitive Sensors. Advanced Interfacing Techniques for Sensors. Smart Sensors, Measurement and Instrumentation. Apr. 2017; 25: 73-109.

* cited by examiner

MICRO-SCALE DEVICE WITH FLOATING CONDUCTIVE LAYER

FIELD OF THE DISCLOSURE

The present application relates to micro-scale devices, such as transformers or capacitors.

BACKGROUND

Micro-scale devices, such as transformers or capacitors, may provide an electric field between components. Electric fields may cause undesirable effects on electrical components.

SUMMARY OF THE DISCLOSURE

Micro-scale devices, such as transformers and capacitors, having a floating conductive layer are disclosed. A floating conductive layer may be disposed in an insulator layer and can reduce a maximum electric field between a first planar conductor and a second planar conductor of a micro-scale passive device. Reduction of a maximum electric field between a first planar conductor and a second planar conductor can reduce undesirable effects on electrical components.

According to various aspects of the present disclosure, there is provided an isolated micro-scale passive device configured to be disposed on a substrate comprising an upper surface. The isolated micro-scale passive device comprises a first planar conductor, a second planar conductor configured to be disposed between the first planar conductor and the substrate, an insulator layer disposed between the first planar conductor and the second planar conductor, and a floating conductive layer in the insulator layer.

According to various aspects of the present disclosure, there is provided an isolated micro-scale passive device configured to be disposed on a substrate comprising an upper surface. The isolated micro-scale passive device comprises a first planar conductor, a second planar conductor configured to be disposed between the first planar conductor and the substrate, a first insulator layer disposed between the first planar conductor and the second planar conductor, a second insulator layer disposed between the first planar conductor and the second planar conductor, and a floating conductive layer disposed between the first insulator layer and the second insulator layer.

According to various aspects of the present disclosure, there is provided an isolated micro-scale passive device configured to be disposed on a substrate comprising an upper surface. The isolated micro-scale passive device comprises a first planar conductor, a second planar conductor configured to be disposed between the first planar conductor and the substrate, and means for reducing a maximum electric field between the first planar conductor and the second planar conductor.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

According to aspects of the present application, a micro-scale device is provided. The micro-scale device may comprise an isolated micro-scale passive device and may include a first planar conductor and a second planar conductor with an insulator layer between the first planar conductor and the second planar conductor. Such a micro-scale passive device is configured to exhibit a reduced maximum electric field. A floating conductive layer in the insulator layer may be configured to reduce the maximum electric field.

The present disclosure relates to micro-scale passive devices. Two types of micro-scale passive devices are planar-coil transformers and planar-plate capacitors. Transformers may be used to transform a first voltage level at a first portion of an electrical circuit to a second voltage level at a second portion of an electrical circuit. Transformers and capacitors may transfer data and/or power signals. Transformers and capacitors may be used to isolate signals between two portions of a circuit, and thus may form part of an isolator or an isolated device. Transformers and capacitors may typically transfer AC signals but may also transfer DC signals.

Micro-scale passive devices such as transformers and capacitors may include two or more micro-scale planar conductors. Each of a first conductor and a second conductor may be arranged on a substrate in a substantially planar configuration. A planar conductor of a transformer may comprise a planar coil. A planar coil may be patterned on a substrate in a substantially spiral shape about a conductor axis. A planar conductor of a capacitor may comprise a planar plate. A planar plate may be patterned on a substrate in a substantially continuous circular shape about a conductor axis.

A first conductor and a second conductor may be held at different voltage potentials. Because of the different voltage potentials of the first conductor and the second conductor, an electric field may develop between the first conductor and the second conductor. An electric field may occur in a transformer due to parasitic capacitance between coils of the transformer. An electric field may occur in a capacitor due to operation of the capacitor.

Such an electric field may include a point having a maximum electric field. The inventors have recognized that electric fields in electronic devices may cause undesirable effects on electrical components. The inventors have recognized that a maximum electric field in electronic devices may be a point of particularly undesirable effects for electrical components.

The inventors have recognized that increasing an insulator layer height may decrease an average electric field of an electronic device. However, the inventors have further recognized that while increasing an insulator layer height may decrease an average electric field of an electronic device inversely proportional to the height of the insulator, increasing the insulator layer height may not decrease a maximum electric field of the electronic device inversely proportional to the increase in height. For example, an increase of insulator height by a factor of two may reduce an average electric field $E\_av$ to an average electric field of $E\_av/2$, but the same increase of insulator height unexpectedly only reduces a maximum electric field $E\_max$ to a maximum electric field of $E\_max/(sqrt(2))$. The inventors have recognized that increasing an insulator height produces diminishing returns for reducing maximum electric field.

The inventors have recognized that providing a floating conductive layer in an insulator layer can reduce the maximum electric field beyond a reduction in maximum electric field due to insulator height increase alone. For example, in some embodiments, an increase of insulator height by a factor of two, in combination with the inclusion of a floating conductive layer approximately halfway up the height of the insulator layer can reduce a maximum electric field $E\_max$ to a maximum electric field of $E\_max/2$. Thus, aspects of the present disclosure provide micro-scale passive devices having a floating conductive layer in an insulator layer.

Figure 1:
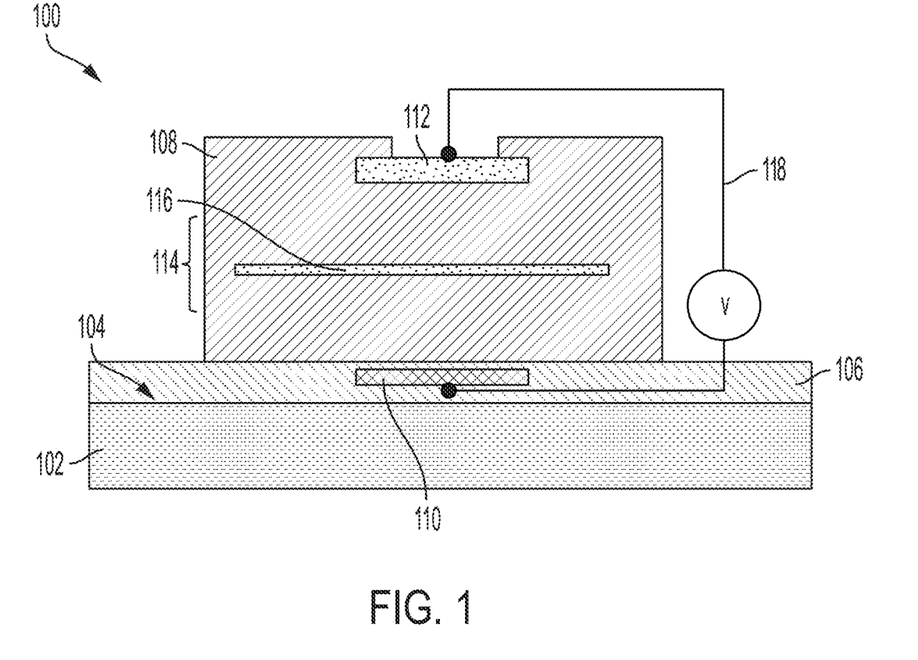
FIG. 1 is a cross-sectional side view of a micro-scale passive device.

FIG. 1 shows a cross-sectional side view of a micro-scale passive device 100. Micro-scale passive device 100 is arranged on a substrate 102 having an upper surface 104, and includes a layer 106, an insulator layer 108, a conductor 110, a conductor 112, a conductive layer 114, the illustrated conductive layer 114 comprising a conductor 116, and a voltage source 118.

Micro-scale passive device 100 may comprise one of various micro-scale passive devices. In some embodiments, micro-scale passive device 100 comprises a transformer. In some embodiments, micro-scale passive device 100 comprises a capacitor. In some embodiments, micro-scale passive device 100 comprises an inductor. In some embodiments, micro-scale passive device 100 comprises an isolator or an isolated micro-scale passive device, for example, an isolated transformer or an isolated capacitor.

The micro-scale passive device 100 includes a conductor 110. In some embodiments, the conductor 110 comprises a planar conductor. In the illustrative embodiment of FIG. 1, the conductor 110 is arranged in a layer 106. In some embodiments, the layer 106 may comprise a first layer. Layer 106 may be patterned to form the conductor 110. In various embodiments, the layer 106 may comprise an oxide layer on the substrate 102. For example, the layer 106 may comprise glass or silicon dioxide.

In FIG. 1, the conductor 110 is arranged above the substrate 102. In embodiments where micro-scale passive device 100 comprises a transformer, the conductor 110 may comprise a coil of the transformer. In embodiments where micro-scale passive device 100 comprises a capacitor, the conductor 110 may comprise a plate of the capacitor. At least one terminal of the conductor 110 may be coupled to a voltage source such as the voltage source 118.

The micro-scale passive device 100 includes a conductor 112. In some embodiments, the conductor 112 comprises a planar conductor. The conductor 112 may be arranged in the insulator layer 108, for example, substantially at the top of insulator layer 108. In other embodiments, the conductor 112 may be arranged in layer above the insulator layer. The conductor 112 may be arranged over and above the conductor 110. The conductor 112 may be arranged such that the conductor 110 is configured to be arranged between the conductor 112 and the substrate 102. In embodiments where micro-scale passive device 100 comprises a transformer, the conductor 112 may comprise a coil of the transformer. In embodiments where micro-scale passive device 100 comprises a capacitor, the conductor 112 may comprise a plate of the capacitor. At least one terminal of the conductor 112 may be coupled to a voltage source such as the voltage source 118.

In some embodiments, conductor 112 may comprise a first conductor and conductor 110 may comprise a second conductor. The conductor 110 and the conductor 112 may be coupled. In an exemplary embodiment where the conductor 110 is arranged on a primary side of the micro-scale passive device 100, and the conductor 112 is arranged on a secondary side of the micro-scale passive device 100, the conductor 110 may be a transmit conductor and the conductor 112 may be a receive conductor. The conductor 110 may transmit signals that are received by the conductor 112. However, each conductor may comprise either a transmit conductor arranged on a primary side or a receive conductor arranged on a secondary side. For example, in some embodiments, the conductor 112 may be arranged on a primary side as a transmit conductor and the conductor 110 may be arranged on a secondary side as a receive conductor. In transformers, transmit conductors may comprise transmit coils and receive conductors may comprise receive coils. In capacitors, transmit conductors may comprise transmit plates and receive conductors may comprise receive plates.

The conductor 110 and the conductor 112 may each be arranged about a respective conductor axis. In some embodiments, such conductor axes are normal to the upper surface 104 of the substrate 102. In some embodiments, the conductor 110 is vertically spaced from the conductor 112 along the conductor axes. In some embodiments, the conductor 110 is disposed in a plane parallel to the upper surface 104 of the substrate 102 and the conductor 112 is disposed in a different plane parallel to the upper surface 104 of the substrate 102. The conductor 110 and the conductor 112 may be patterned, in their respective layers, such that the conductor 110 and the conductor 112 are respectively patterned normal to the conductor axes. In some embodiments, the conductor axes are approximately aligned with each other, or may comprise a same conductor axis.

The micro-scale passive device 100 includes a conductive layer 114. In some embodiments, the conductive layer may comprise a floating conductive layer, for example, when the conductive layer 114 is not coupled to other conductive elements. In some embodiments, the conductive layer 114 is disposed such that is only in contact with insulative elements, such as the insulator layer 108. In some embodiments, the conductive layer 114 may not be held to any potential voltage or ground. In some embodiments, the conductive layer 114 may be embedded in the insulator layer 108. In some embodiments, the conductive layer 114 may be encapsulated by the insulator layer 108.

The conductive layer 114 is arranged between the conductor 110 and the conductor 112, along the direction of the conductor axes. The conductive layer 114 may further be arranged at least partially between the conductor 110 and the conductor 112 along directions approximately perpendicular to the conductor axes.

In some embodiments, the conductive layer 114 may comprise a conductor 116, which may be a planar conductor. Conductor 116 may comprise a third conductor. Conductor 116 may comprise an intermediate conductor. For example, conductor 116 may be patterned in a different plane than the conductor 110 and conductor 112. The plane of conductor 116 may be parallel to upper surface 104 of substrate 102, such that the conductor 116 is patterned normal to the conductor axes. In some embodiments, the conductor 116 comprises a first surface and a second surface. The first surface may be substantially planar. The second surface may be substantially planar. A first planar surface may face the conductor 110 and a second planar surface may face the conductor 112. In some embodiments, each of a first planar surface and a second planar surface is completely covered by the insulator layer 108. In various embodiments, the conductor 116 may extend a distance along a direction perpendicular to the conductor axes that is greater than a distance along the direction perpendicular to the conductor axes that one or more of the conductor 110 or the conductor 112 extends. In various embodiments, a conductor 116 may have a thickness along the conductor axes of greater than approximately 0.4 microns, greater than approximately 2 microns, less than approximately 6 microns, less than approximately 8 microns, between approximately 0.4 microns and approximately 8 microns, between approximately 2 microns and approximately 6 microns, or of approximately 4 microns.

In FIG. 1, the conductive layer 114 is arranged in the insulator layer 108. The insulator layer 108 is arranged between the conductor 110 and the conductor 112. In some embodiments, a first portion of the insulator layer 108 is disposed between the conductive layer 114 and the conductor 110. In some embodiments, a second portion of the insulator layer 108 is disposed between the conductive layer 114 and the conductor 112. In some embodiments, the insulator layer 108 may be formed as a first insulator layer between one or more of the substrate 102 or the layer 106 and the conductive layer 114 and a second insulator layer between the conductive layer 114 and the conductor 112. The insulator layer 108 may comprise an isolation layer, which may be formed of an insulating or dielectric material. In some embodiments, the insulator layer 108 may comprise a polymer such as polyimide.

An electric field may develop between the conductor 110 and the conductor 112. In both embodiments where the micro-scale passive device 100 comprises a transformer and embodiments where the micro-scale passive device 100 comprises a capacitor, when a voltage is applied between the conductor 110 and the conductor 112 by the voltage source 118, an electric field may develop between the conductor 110 and the conductor 112. In various embodiments, the voltage source may apply one or more of AC signals, DC signals, or a combination thereof, across the conductor 110 and the conductor 112.

The electric field may be a result of a voltage differential between the conductor 110 and the conductor 112. In some embodiments, an electric field occurs when micro-scale passive device 100 comprises a capacitor due to operation of the capacitor. In some embodiments, an electric field occurs when micro-scale passive device 100 comprises a transformer due to parasitic capacitance between coils, for example, planar coils, of the transformer. Within the electric field, there may be a point having a maximum electric field. The conductive layer 114 may be configured to reduce the maximum electric field of the micro-scale passive device 100. A conductor, for example, conductor 116 in FIG. 1, may be configured to reduce the maximum electric field of the micro-scale passive device 100. For example, the conductive layer 114 may float at an intermediate voltage potential between, for example, approximately halfway between, a voltage potential of conductor 110 and a voltage potential of conductor 112. By floating at the intermediate voltage potential, the conductive layer may reduce the maximum electric field at any given point. The conductive layer 114 may float at the intermediate voltage potential by not being held to a voltage potential or ground by other electrical components.

Conductors such as coils or plates, conductive layers such as planar conductors or conductive particles, and other elements may comprise various materials. In some embodiments, conductors or conductive layers comprise conductive materials, for example, metals such as copper, gold, or aluminum, or may comprise semiconductor materials, such as doped semiconductor materials. In some embodiments, each conductor and conductive layer is arranged in a metallization layer, or is arranged in more than one metallization layer.

The substrate 102 has an upper surface 104. The upper surface 104 may be substantially planar. The upper surface of the substrate 104 is arranged between the substrate 102 and the layer 106.

According to aspects of the present application, a substrate, such as substrate 102, may comprise various materials. In some embodiments, a substrate may comprise a semiconductor material. For example, a substrate may comprise a bulk or monocrystalline semiconductor substrate, such as a bulk or monocrystalline silicon substrate. In some embodiments, a substrate may comprise a deposited semiconductor substrate, such as polycrystalline silicon. In some embodiments, a substrate may comprise a silicon-on-insulator substrate or may comprise a buried oxide layer. Other semiconductor materials may be used as substrates. In some embodiments, a substrate, such as substrate 102, may comprise a glass substrate or a printed circuit board (PCB).

Figure 2:
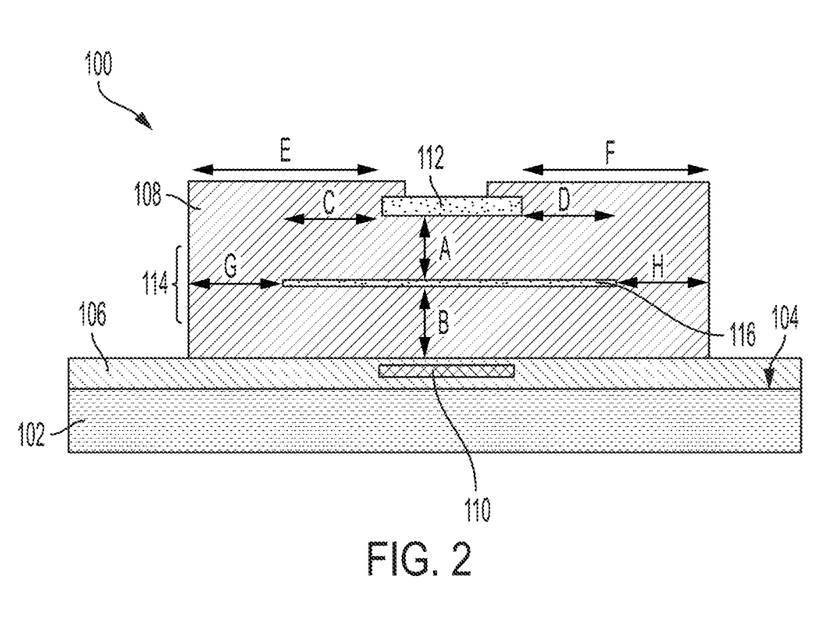
FIG. 2 is a cross-sectional side view of a micro-scale passive device.

FIG. 2 shows a cross-sectional side view of a micro-scale passive device 100 showing distance A, distance B, distance C, distance D, distance E, distance F, distance G, and distance H. In some embodiments, the cross-section of FIG. 2 may be taken such that the illustrated cross-sections of the insulator layer 108, the conductor 110, the conductor 112, and conductor 116 illustrates a greatest dimension of each of these components along a direction perpendicular to the conductor axes.

In some embodiments, distance A comprises a measurement, along a direction parallel to the conductor axes, between conductor 112 and conductor 116. In some embodiments, distance B comprises a measurement, along a direction parallel to the conductor axes, between layer 106 and conductor 116. In some embodiments, distance C comprises a measurement, along a direction perpendicular to the conductor axes, between an outermost edge of conductor 112 and an outermost edge of conductor 116, the outermost edges being arranged, for illustration purposes only, on a left side of FIG. 2. In some embodiments, distance D comprises a measurement, along a direction perpendicular to the conductor axes, between an outermost edge of conductor 112 and an outermost edge of conductor 116, the outermost edges being arranged, for illustration purposes only, on a right side of FIG. 2. In some embodiments, distance E comprises a measurement, along a direction perpendicular to the conductor axes, between an outermost edge of insulator layer 108 and an outermost edge of conductor 112, the outermost edges being arranged, for illustration purposes only, on a left side of FIG. 2. In some embodiments, distance F comprises a measurement, along a direction perpendicular to the conductor axes, between an outermost edge of insulator layer 108 and an outermost edge of conductor 112, the outermost edges being arranged, for illustration purposes only, on a right side of FIG. 2. In some embodiments, distance G comprises a measurement, along a direction perpendicular to the conductor axes, between an outermost edge of insulator layer 108 and an outermost edge of conductor 116, the outermost edges being arranged, for illustration purposes only, on a left side of FIG. 2. In some embodiments, distance H comprises a measurement, along a direction perpendicular to the conductor axes, between an outermost edge of insulator layer 108 and an outermost edge of conductor 116, the outermost edges being arranged, for illustration purposes only, on a right side of FIG. 2.

In various embodiments, distance A may be approximately equal to distance B such that the conductive layer 114 and conductor 116 are disposed about approximately halfway between the conductor 110 and the conductor 112, along the conductor axes. Distance C may be approximately equal to distance D. Distance E may be approximately equal to distance F. Distance G may be approximately equal to distance H. In some embodiments, Distance C may be approximately double distance A. In some embodiments, distance E may be approximately double distance G. In some embodiments, distance C may be approximately equal to distance G. In some embodiments, distance A may be approximately 20 microns. In some embodiments, distance C may be approximately 10 microns.

Figure 3:
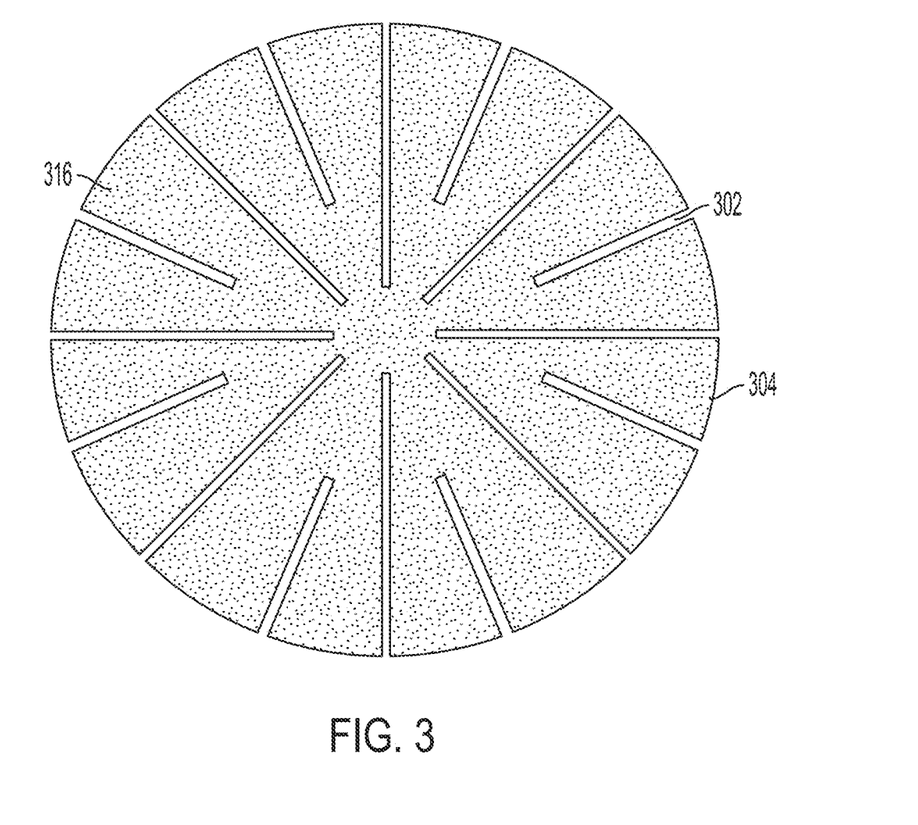
FIG. 3 is a top view of a component of a micro-scale passive device.

FIG. 3 shows a top view of a conductor 316, a component of a micro-scale passive device such as micro-scale passive device 100. Conductor 316 may comprise a planar conductor. In some embodiments, the conductive layer 114 shown in FIG. 1 may comprise the conductor 316.

The conductor 316 may be included in the micro-scale passive device 100 when the micro-scale passive device 100 comprises a transformer, when the conductor 110 and the conductor 112 of the micro-scale passive device 100 comprise a first coil and a second coil.

As illustrated in the exemplary embodiment of FIG. 3, the conductor 316 may comprise a substantially circular shape having a substantially circular perimeter in a plane normal to the conductor axes. However, aspects of the present disclosure are not limited by the shape of the conductor 316. For example, the conductor 316 may alternatively have any shape and perimeter substantially corresponding to one or more of a first coil or a second coil of a micro-scale passive device that comprises the conductor 316.

The inventors have recognized, for micro-scale passive devices that comprise transformers, it may be beneficial allow the magnetic field to substantially pass through a conductor. In some embodiments, a conductor, such as conductor 316 in FIG. 4, may be configured to reduce or substantially eliminate the amount of the magnetic field that is blocked by the conductor, so that the magnetic field is substantially entirely passed through the conductor.

Conductor 316 may comprise a slotted conductor. For example, conductor 316 may comprise at least one slot 302. The at least one slot 302 is configured to reduce eddy currents in conductor 316. The at least one slot 302 may form at least one high aspect ratio segment 304 in the conductor 316. The at least one high aspect ratio segment 304 is configured to reduce eddy currents in the conductor 316. The plurality of high aspect ratio segments may be patterned to form the overall circular or other shape of the conductor 316.

Eddy currents may develop in electrical components of transformers. Eddy currents are closed loops of electric current which may be induced in the conductor 316 or another electrical component perpendicular to a changing magnetic field passing through the electrical component. The physical space, such as the two-dimensional area in a plane perpendicular to the magnetic field, through which the changing magnetic field passes may determine the size of the eddy current loop. The magnitude of the current is proportional to the size of the loop. A larger current corresponds to a larger loss in energy from the magnetic field, which decreases the efficiency of a transformer. Therefore, reducing the size of the loop, for example by using the slots 302 and high aspect ratio segments 304, will allow more of the magnetic field to pass through the conductor 316 and will reduce or substantially eliminate the effect of reduced efficiency from eddy current.

Figure 4:
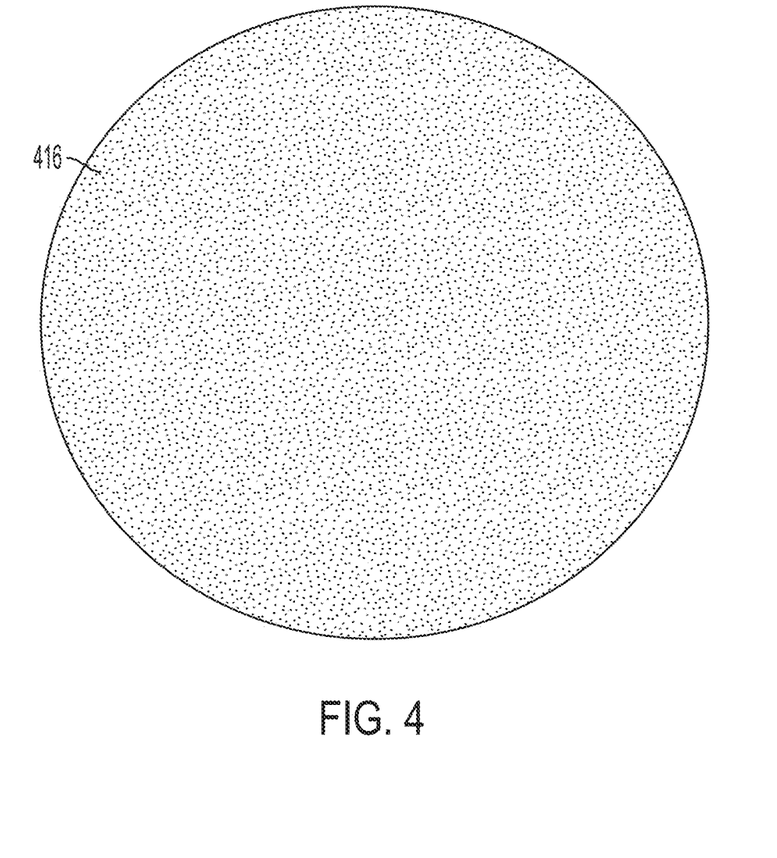
FIG. 4 is a top view of a component of a micro-scale passive device.

FIG. 4 shows a top view of a conductor 416, a component of a micro-scale passive device such as micro-scale passive device 100. Conductor 416 may comprise a planar conductor. In some embodiments, the conductive layer 114 shown in FIG. 1 may comprise the conductor 416.

The conductor 416 may be included in the micro-scale passive device 100 when the micro-scale passive device 100 comprises a capacitor, when the conductor 110 and the conductor 112 of the micro-scale passive device 100 comprise a first plate and a second plate.

As illustrated in the exemplary embodiment of FIG. 4, the conductor 416 may comprise a substantially circular shape having a substantially circular perimeter in a plane normal to the conductor axes described above. However, aspects of the present disclosure are not limited by the shape of the conductor 416. For example, the conductor 416 may alternatively have any shape and perimeter substantially corresponding to one or more of a first plate or a second plate of a micro-scale passive device that comprises the conductor 416.

Conductor 416 may comprise a continuous conductor. For example, in some embodiments, conductor 416 may not comprise at least one slot and may not comprise at least one high aspect ratio segment. In some embodiments, conductor 416 does not comprise at least one slot and does not comprise at least one high aspect ratio segment because the conductor 416 is not configured to experience substantial changing magnetic fields and therefore is not configured to develop substantial eddy currents.

Figure 5:
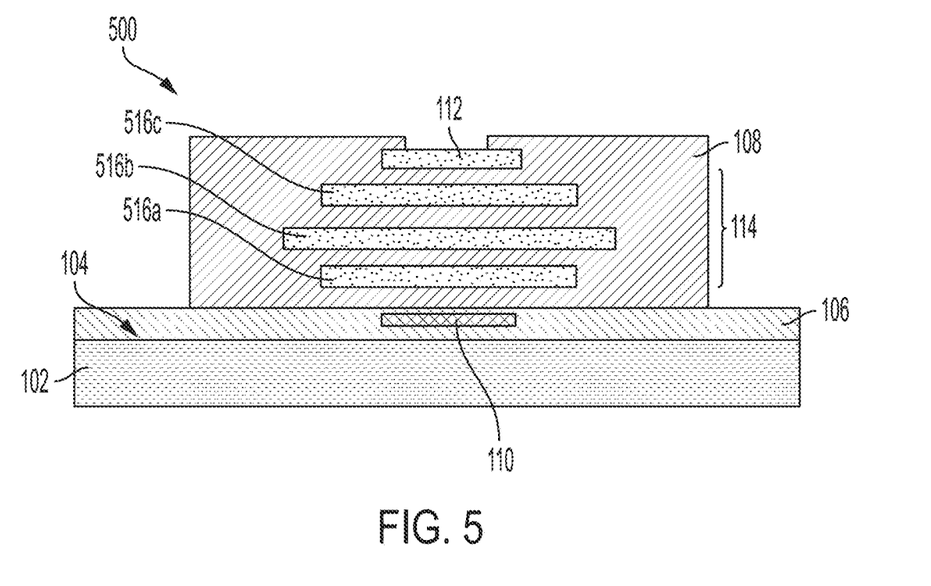
FIG. 5 is a cross-sectional side view of a micro-scale passive device.

FIG. 5 shows a cross-sectional side view of a micro-scale passive device 500. Micro-scale passive device 500 comprises an alternative arrangement of conductive layer 114. Micro-scale passive device 500 is arranged on a substrate 102 having an upper surface 104, and includes a layer 106, an insulator layer 108, a conductor 110, a conductor 112, a conductive layer 114, the illustrated conductive layer 114 comprising a conductor 516a, a conductor 516b, and a conductor 516c. While not illustrated in FIG. 5, micro-scale passive device 500 may include a voltage source such as voltage source 118.

In some embodiments, a conductive layer 114 may comprise a plurality of conductors. For example, in FIG. 5, conductive layer 114 comprises a conductor 516a, a conductor 516b, and a conductor 516c. Each of the conductor 516a, the conductor 516b, and the conductor 516c may comprise a planar conductor. In some embodiments, each of the conductor 516a, the conductor 516b, and the conductor 516c comprises a portion of a floating conductive layer, and for example, may comprise a floating conductor in the insulator layer 108. A plurality of conductors, for example, conductor 516a, conductor 516b, and conductor 516c in FIG. 5, may be configured to reduce the maximum electric field of the micro-scale passive device 100. Micro-scale passive device 500 having a conductive layer comprising a plurality of conductors, for example, conductor 516a, conductor 516b, and conductor 516c in FIG. 5 may provide a further decrease in maximum electric field compared to micro-scale passive devices having a conductive layer comprising only a single conductor. In some embodiments, micro-scale passive device 500 may have a greater insulator height than micro-scale passive device 100.

The conductor 516a, the conductor 516b, and the conductor 516c are spaced along the conductor axes such that each of the conductor 516a, the conductor 516b, and the conductor 516c is disposed in a different plane that is normal to the conductor axes. In some embodiments a portion of insulator layer 108 is disposed between each adjacent conductor. In some embodiments, an insulator layer is formed between each adjacent conductor.

In various embodiments, each of the conductor 516a, the conductor 516b, and the conductor 516c may extend a distance along a direction perpendicular to the conductor axes that is greater than a distance along the direction perpendicular to the conductor axes that one or more of the conductor 110 or the conductor 112 extends.

In various embodiments, each subsequently more centrally-located conductor may extend a distance along a direction perpendicular to the conductor axes that is greater than a distance along the direction perpendicular to the conductor axes that each subsequently less centrally-located conductor extends. For example, in FIG. 5, the more centrally located conductor 516b extends a distance along a direction perpendicular to the conductor axes that is greater than a distance along the direction perpendicular to the conductor axes that each of the conductor 516a and the conductor 516c extends.

While FIG. 5 shows a conductive layer comprising three conductors, such an arrangement of conductors, including the arrangement of conductor extension distance, may be applied to any number of conductors, such as two, four, five, six, or greater than six conductors. In embodiments comprising an even number of conductors, the two inner most conductors may extend approximately a same distance.

Figure 6:
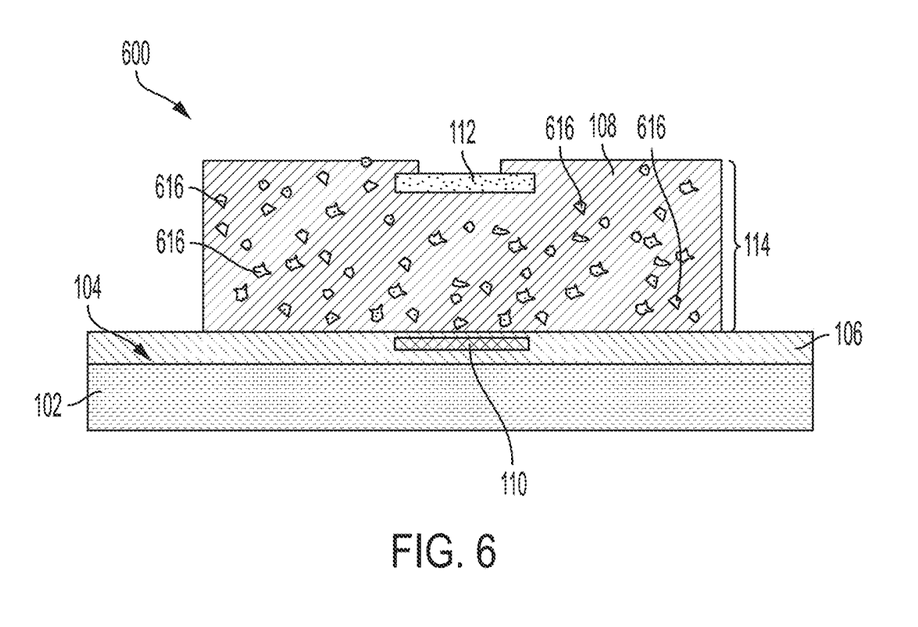
FIG. 6 is a cross-sectional side view of a micro-scale passive device.

FIG. 6 shows a cross-sectional side view of a micro-scale passive device 600. Micro-scale passive device 600 comprises an alternative arrangement of conductive layer 114. Micro-scale passive device 600 is arranged on a substrate 102 having an upper surface 104, and includes a layer 106, an insulator layer 108, a conductor 110, a conductor 112, a conductive layer 114, the illustrated conductive layer 114 comprising a plurality of conductors 616. While not illustrated in FIG. 6, micro-scale passive device 600 may include a voltage source such as voltage source 118. A plurality of conductive particles, for example, conductive particles 616 in FIG. 6, may be configured to reduce the maximum electric field of the micro-scale passive device 100.

In some embodiments, a conductive layer 114 may comprise a plurality of conductive particles. For example, in FIG. 6, conductive layer 114 comprises a plurality of conductive particles 616, of which only four are labeled for illustrative purposes. In some embodiments, each of the conductive particles 616 comprises a portion of a floating conductive layer, and for example, may comprise a floating conductor in the insulator layer 108. In some embodiments, the conductive particles 616 may be distributed throughout the insulator layer 108. In some embodiments, the conductive particles 616 may be distributed substantially evenly within the insulator layer 108. In some embodiments, the conductive particles 616 may be distributed substantially from a lower surface to an upper surface of the insulator layer 108. In some embodiments, some of the conductive particles 616 may be distributed in the insulator layer 108 in a same plane as the conductor 112 such that the conductive particles are arranged adjacent to the conductor 112 along a direction perpendicular to the conductor axes.

In various embodiments, a conductive particle may have a thickness along the conductor axes, a width along a direction perpendicular to the conductor axes, or a maximum transverse width in any direction of greater than approximately 0.4 microns, greater than approximately 2 microns, less than approximately 6 microns, less than approximately 8 microns, between approximately 0.4 microns and approximately 8 microns, between approximately 2 microns and approximately 6 microns, or of approximately 4 microns.

Figure 7:
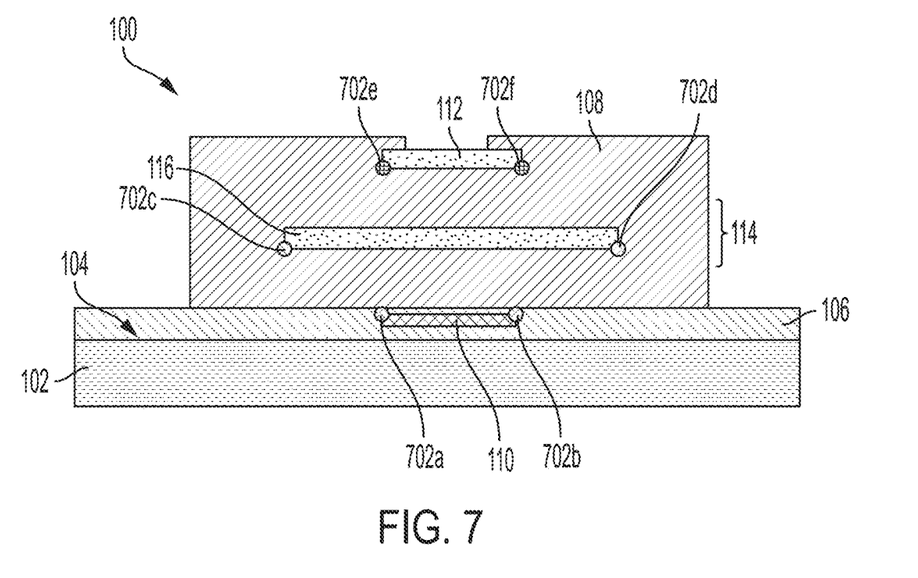
FIG. 7 is a cross-sectional side view of a micro-scale passive device.

FIG. 7 shows a cross-sectional side view of a micro-scale passive device 100 showing point 702a and point 702b on conductor 110, point 702c and point 702d on conductor 116, and point 702e and point 702f on conductor 112. In various embodiments, one or more of point 702e or point 702f may be a point having a maximum electric field of the micro-scale passive device 100. Voltage source 118 is not shown in FIG. 7 for illustrative purposes.

In some embodiments, when conductor 116 comprises a thin conductor, such as a conductor having a thickness of approximately 0.4 microns, one or more of point 702c or point 702d may be a point having a maximum electric field of the micro-scale passive device 100. In the illustrative embodiment of FIG. 7, point 702c and point 702d are arranged at an outer edge of a lower surface of conductor 116. However, in some embodiments, alternatively or additionally, one or more points arranged at an outer edge of a top surface of conductor 116 may be a point having a maximum electric field of the micro-scale passive device 100 when conductor 116 comprises a thin conductor.

In some embodiments, when conductor 116 comprises a thin conductor, such as a conductor having a thickness of approximately 0.4 microns, one or more of point 702a or point 702b may have an increased electric field compared to an arrangement when conductor 116 does not comprise a thin conductor. In some embodiments, one or more of points 702e or point 702f has a high electric field. For example, in some embodiments, points 702e and 702f may age at an accelerated rate during high voltage endurance (HVE), such as when a conductive layer 114 is more closely coupled to conductor 110 than to conductor 112, as discussed in more detail below.

Figure 8:
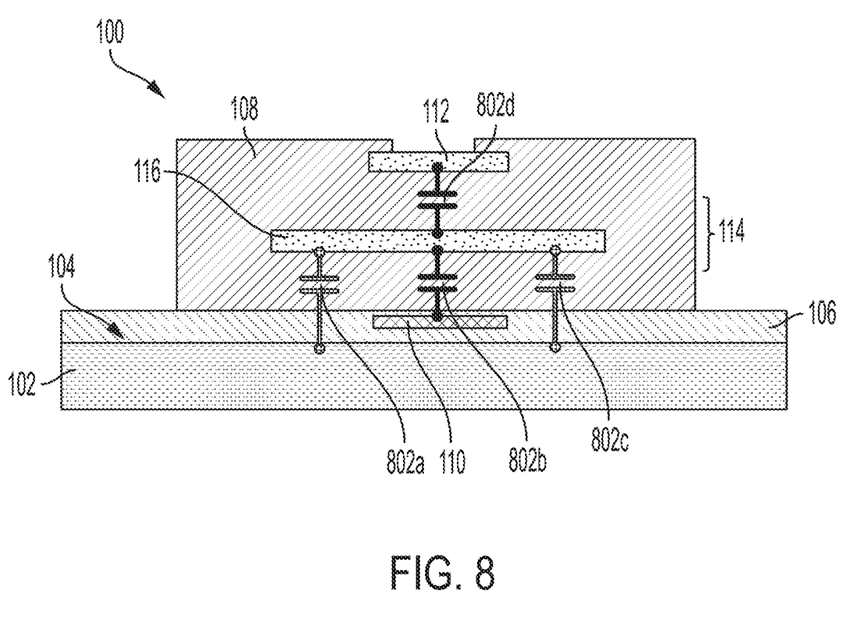
FIG. 8 is a cross-sectional side view of a micro-scale passive device.

FIG. 8 shows a cross-sectional side view of a micro-scale passive device 100 showing capacitance 802a, capacitance 802b, capacitance 802c, and capacitance 802d. Voltage source 118 is not shown in FIG. 8 for illustrative purposes.

Capacitance 802a may represent a capacitance between the conductor 116 and the substrate 102. Capacitance 802b may represent a capacitance between the conductor 116 and conductor 110. Capacitance 802c may represent a capacitance between the conductor 116 and the substrate 102. Capacitance 802d may represent a capacitance between the conductor 116 and conductor 112. In some embodiments, capacitance 802b may be approximately balanced by capacitance 802d.

In some embodiments, a first capacitance may comprise a capacitance between the conductor 116 and the combination of the substrate 102 and conductor 110. In some embodiments, a first capacitance may comprise a lower capacitance or a bottom capacitance. In some embodiments, the first capacitance may comprise a total capacitance of capacitance 802a, capacitance 802b, and capacitance 802c.

In some embodiments, a second capacitance may comprise a capacitance between conductor 116 and conductor 112. In some embodiments, a second capacitance may comprise an upper capacitance or a top capacitance. In some embodiments, the second capacitance may comprise capacitance 802d.

In some embodiments, the first capacitance may be greater than the second capacitance. In some embodiments, the greater first capacitance may cause the conductor 116 to have a voltage potential closer to a voltage potential of the conductor 110 than to a voltage potential of the conductor 112. Conductor 116 having a voltage potential closer to a voltage potential of the conductor 110 than to a voltage potential of the conductor 112 may cause the average electric field between conductor 116 and conductor 112 to be a higher average electric field than if the first capacitance was approximately balanced with the second capacitance. Conductor 116 having a voltage potential closer to a voltage potential of the conductor 110 than to a voltage potential of the conductor 112 may cause one or more of point 702e or point 702f to have a higher electric field, such as a higher maximum electric field, than if the second capacitance was approximately balanced with the first capacitance.

In some embodiments, the conductor 116 is forced to have a voltage potential halfway between a voltage potential of the conductor 110 and a voltage potential of the conductor 112. In such embodiments, the increase in average and maximum electric field due to capacitance imbalance may be reduced or substantially eliminated.

The inventors have recognized that at high voltages, for example, a voltage just below a breakdown voltage, the conductor 116 may attain the voltage potential closer to halfway between a voltage potential of the conductor 110 and a voltage potential of the conductor 112 due to leakage that occurs at voltages just below the breakdown voltage. In some embodiments, the leakage precedes breakdown and may lift voltage potential of the conductor 116 away from the substrate 102 or conductor 110 voltage potential and closer to the conductor 112 voltage potential. In some embodiments, the shift of voltage potential of the conductor 116 due to the leakage may reduce the electric field for the conductor 112, and may in some embodiments counteract the greater first capacitance, therefore reducing the electric field at one or more of point 702e or point 702f.

Figure 9:
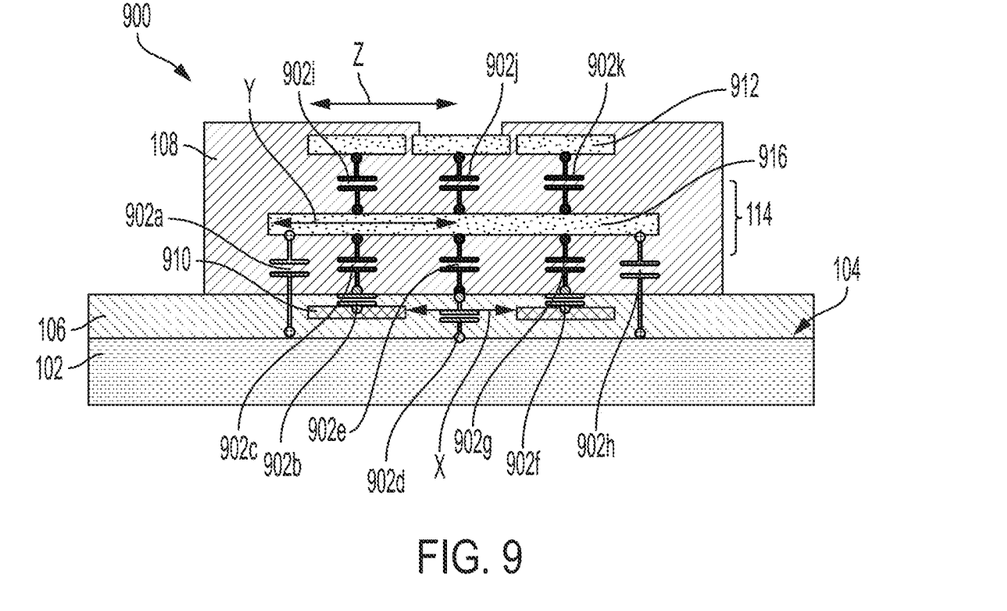
FIG. 9 is a cross-sectional side view of a micro-scale passive device.

FIG. 9 shows a cross-sectional side view of a micro-scale passive device 900. Micro-scale passive device 900 is arranged on a substrate 102 having an upper surface 104, and includes a layer 106, an insulator layer 108, a conductor 910, a conductor 912, and a conductive layer 114, the illustrated conductive layer 114 comprising a conductor 916. While not illustrated in FIG. 9, micro-scale passive device 900 may include a voltage source such as voltage source 118.

In some embodiments, micro-scale passive device 900 may comprise the micro-scale passive device 100. Conductor 910 may comprise conductor 110. In the illustrative embodiment of FIG. 9, conductor 910 comprises a planar coil. Conductor 912 may comprise conductor 112. In the illustrative embodiment of FIG. 9, conductor 912 comprises a planar coil. While the conductive layer 114 is illustrated in FIG. 9 as a conductor 916, other arrangements are possible. For example, conductive layer 114 of FIG. 9 may comprise a plurality of conductors or a plurality of conductive particles.

In some embodiments, conductor 910 may comprise a coil hole. Distance X may comprise a coil hole diameter of the conductor 910. In some embodiments, distance Y may comprise a radius of conductor 116. In some embodiments, conductor 912 may not comprise a coil hole. In some embodiments, distance Z may comprise a coil outer radius of the conductor 912.

FIG. 9 shows capacitance 902a, capacitance 902b, capacitance 902c, capacitance 902d, capacitance 902e, capacitance 902f, capacitance 902g, capacitance 902h, capacitance 902i, capacitance 902j, and capacitance 902k. FIG. 9 shows distance X, distance Y, and distance Z. In some embodiments, a difference between distance Y and distance Z may be approximately 40 microns.

Capacitance 902a may represent a capacitance between the conductor 916 and the substrate 102. Capacitance 902b may represent a capacitance between a surface of layer 106 that contacts the insulator layer 108 and an outer portion of conductor 910. Capacitance 902c may represent a capacitance between conductor 916 and the surface of layer 106. Capacitance 902d may represent a capacitance between the surface of layer 106 and the substrate 102. Capacitance 902e may represent a capacitance between conductor 916 and the surface of layer 106. Capacitance 902f may represent a capacitance between the surface of layer 106 and an outer portion of conductor 910. Capacitance 902g may represent a capacitance between the conductor 916 and the surface of layer 106. Capacitance 902h may represent a capacitance between the conductor 916 and the substrate 102.

Capacitance 902i may represent a capacitance between the conductor 916 and an outer portion of conductor 912. Capacitance 902j may represent a capacitance between the conductor 916 and an inner portion of conductor 912. Capacitance 902k may represent a capacitance between the conductor 916 and an outer portion of conductor 912.

In some embodiments, capacitance 902c may be approximately balanced with capacitance 902i. In some embodiments, capacitance 902e may be approximately balanced with capacitance 902j. In some embodiments, capacitance 902g may be approximately balanced with capacitance 902k.

The total capacitance of capacitance 902a, capacitance 902b, capacitance 902c, capacitance 902d, capacitance 902e, capacitance 902f, capacitance 902g and capacitance 902h may provide a first capacitance for micro-scale passive device 900. The total capacitance of capacitance 902i, capacitance 902j, and capacitance 902k may provide a second capacitance for micro-scale passive device 900.

In some embodiments, capacitance 902a may increase the first capacitance. In some embodiments, capacitance 902h may increase the first capacitance. In some embodiments, capacitance 902b may decrease the first capacitance. In some embodiments, capacitance 902d may decrease the first capacitance. In some embodiments, capacitance 902f may decrease the first capacitance. These increases and decreases may result in an imbalance between the first capacitance and the second capacitance. For example, the first capacitance may be greater than the second capacitance.

The inventors have recognized various conditions that affect the balance of the first capacitance and the second capacitance. The inventors have recognized that the presence of the substrate 102 may increase the first capacitance. The inventors have recognized that the difference between distance Y, the radius of conductor 916 and the distance Z, the radius of the conductor 912 may increase the first capacitance. The inventors have recognized that the presence of a coil hole for the conductor 910 and the absence of a coil hole in the conductor 912 may decrease the first capacitance. The inventors have recognized that a thickness of layer 106 may decrease the first capacitance.

The inventors have recognized that balancing the capacitances may provide a more robust micro-scale passive device under at least some operating conditions. The inventors have recognized that increasing distance X, the diameter of the coil hole, may decrease the first capacitance. The inventors have recognized that increasing the thickness of layer 106 may, for example, to a thickness of approximately 50 microns, may decrease the first capacitance or substantially balance the first capacitance with the second capacitance. The inventors have recognized that decreasing the difference between distance Y, the radius of conductor 916 and the distance Z, the radius of the conductor 912, for example, to approximately 10 microns, may decrease the first capacitance or substantially balance the first capacitance with the second capacitance.

The inventors have recognized that the distances A and B of FIG. 2 may be formed having heights that approximately balance the first capacitance with the first capacitance. For example, distance A may be configured to be less than distance B. In some embodiments, the total thickness of the insulator layer 108 may be approximately 40 microns. In such an embodiment, to balance the first capacitance with the first capacitance, distance A may be configured to be between approximately 1 micron and approximately 2 microns less than distance B. In various embodiments, distance A may be configured to be between approximately 2.5% and approximately 12.5%, or between approximately 5% and approximately 10%, or between approximately 5% and approximately 10%, or between approximately 6.25% and approximately 8.75%, or approximately 7.5% less than distance B. Provided an insulator layer 108 having these conditions may substantially balance the first capacitance with the second capacitance.

A micro-scale passive device according to aspects of the present disclosure, such as a micro-scale passive device including a stack of a double insulator height and a conductive layer in the insulator layer may have various advantages compared to a micro-scale passive device of a back to back design. A micro-scale passive device of a back to back design may include two serial, adjacent stacks of a single insulator height having no conductive layer in the insulator layer.

In some embodiments, a micro-scale passive device of the present disclosure may have higher coupling factor than a micro-scale passive device of the back to back design. For example, where a stack of a single insulator height has a coupling factor of K, a micro-scale passive device of the present disclosure may have a coupling factor of approximately K/1.3 while a micro-scale passive device of the back to back design may have a coupling factor as a function of K^2 of approximately K/2. In some embodiments, a micro-scale passive device of the present disclosure may have an approximately 54% higher coupling factor than a micro-scale passive device of the back to back design.

In some embodiments, a micro-scale passive device of the present disclosure may occupy less area on the surface of a substrate than a micro-scale passive device of the back to back design. For example, a micro-scale passive device of the present disclosure may occupy approximately 40% less area on the surface of a substrate than a micro-scale passive device of the back to back design.

In some embodiments, a micro-scale passive device of the present disclosure may exhibit smaller IR losses than a micro-scale passive device of the back to back design. For example, a micro-scale passive device of the present disclosure may exhibit approximately 40% smaller IR losses than a micro-scale passive device of the back to back design.

In some embodiments, a micro-scale passive device of the present disclosure may exhibit smaller IR losses than a micro-scale passive device of the back to back design due to smaller required conductor size due to requiring fewer transmit and receive conductors.

In some embodiments, a micro-scale passive device of the present disclosure may not require the isolated substrate that a micro-scale passive device of the back to back design may require due to conductors of the isolated substrate being held to a higher voltage potential. Accordingly, an some embodiments, a micro-scale passive device of the present disclosure may have a smaller, less complex, or less costly substrate than a micro-scale passive device of the back to back design.

A method of manufacturing a micro-scale passive device may comprise the steps of forming each of the layers described with respect to any of FIGS. 1, 2, 5, 6, 7, 8, and 9, and patterning each of the conductors and conductive layers, including conductors of FIGS. 3 and 4. For example, a substrate may be provided. A layer including a conductor may be formed on the substrate. The conductor may be patterned in the layer in the arrangements described above. At least one insulator layer including at least one conductive layer may be formed on the layer. The at least one conductive layer may be pattered in the at least one insulator layer in the arrangements described above. A conductor may be patterned in or above the insulator layer in the arrangements described above.

A method of operating a micro-scale passive device may comprise the steps of applying a set of signals to the terminals of a first conductor and the terminals of a second conductor of the micro-scale passive device to provide an electric field is between the first conductor and the second conductor. The method may comprise reducing the maximum electric field between the first conductor and the second conductor. The method may comprise reducing the maximum electric field between the first conductor and the second conductor using at least one floating conductive layer in an insulator layer.

While floating conductive layers in the present application may generally be described with respect to micro-scale passive devices such as transformers and capacitors, aspects of the present application may be applied to other electronic devices. For example, in some embodiments, floating conductive layers described in the present application may be applied to other transformers, capacitors, other micro-scale devices, or other electronic devices that exhibit undesirable electric fields or maximum electric fields.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:
1. An isolated micro-scale passive device configured to be disposed on a substrate comprising an upper surface, the isolated micro-scale passive device comprising:
 a first planar conductor;

a second planar conductor configured to be disposed between the first planar conductor and the substrate;
an insulator layer disposed between the first planar conductor and the second planar conductor; and
a floating conductive layer in the insulator layer, wherein:
the first planar conductor has a first spacing from the floating conductive layer;
the second planar conductor has a second spacing from the floating conductive layer;
the first spacing is less than the second spacing such that the first spacing and the second spacing are configured to substantially balance a first capacitance of the isolated micro-scale passive device with a second capacitance of the isolated micro-scale passive device;
the first capacitance comprises:
a capacitance between the floating conductive layer and the second planar conductor; and
a capacitance between the floating conductive layer and the substrate; and
the second capacitance comprises a capacitance between the floating conductive layer and the first planar conductor.

2. The isolated micro-scale passive device of claim 1, wherein:
the second planar conductor extends a first distance along an axis parallel to the upper surface of the substrate;
the floating conductive layer comprises at least one conductor extending a second distance along the axis; and
the second distance is greater than the first distance.

3. The isolated micro-scale passive device of claim 1, wherein the floating conductive layer is embedded within the insulator layer.

4. The isolated micro-scale passive device of claim 1, wherein the floating conductive layer comprises a third planar conductor.

5. The isolated micro-scale passive device of claim 4, wherein:
the third planar conductor comprises a first planar surface and a second planar surface; and
each of the first planar surface and the second planar surface is completely covered by the insulator layer.

6. The isolated micro-scale passive device of claim 1, wherein:
a first portion of the insulator layer is disposed between the floating conductive layer and the first planar conductor; and
a second portion of the insulator layer is disposed between the floating conductive layer and the second planar conductor.

7. The isolated micro-scale passive device of claim 1, wherein the conductive layer comprises a plurality of conductive particles.

8. The isolated micro-scale passive device of claim 1, wherein the floating conductive layer comprises a plurality of third planar conductors.

9. An isolated micro-scale passive device configured to be disposed on a substrate comprising an upper surface, the isolated micro-scale passive device comprising:
a first planar conductor;
a second planar conductor configured to be disposed between the first planar conductor and the substrate;
a first insulator layer disposed between the first planar conductor and the second planar conductor;
a second insulator layer disposed between the first planar conductor and the second planar conductor; and
a floating conductive layer disposed between the first insulator layer and the second insulator layer, wherein:
the first planar conductor has a first spacing from the floating conductive layer;
the second planar conductor has a second spacing from the floating conductive layer;
the first spacing is less than the second spacing such that the first spacing and the second spacing are configured to substantially balance a first capacitance of the isolated micro-scale passive device with a second capacitance of the isolated micro-scale passive device;
the first capacitance comprises:
a capacitance between the floating conductive layer and the second planar conductor; and
a capacitance between the floating conductive layer and the substrate; and
the second capacitance comprises a capacitance between the floating conductive layer and the first planar conductor.

10. The isolated micro-scale passive device of claim 9, wherein the first planar conductor is spaced from the second planar conductor along an axis normal to the upper surface of the substrate.

11. The isolated micro-scale passive device of claim 10, wherein:
the first planar conductor is disposed in a first plane parallel to the upper surface of the substrate; and
the second planar conductor is disposed in a second plane parallel to the upper surface of the substrate.

12. The isolated micro-scale passive device of claim 10, wherein:
the floating conductive layer comprises a plurality of third planar conductors; and
the plurality of third planar conductors are spaced along the axis.

13. The isolated micro-scale passive device of claim 10, wherein the floating conductive layer is disposed about approximately halfway between the first planar conductor and the second planar, along the axis.

14. The isolated micro-scale passive device of claim 10, wherein a distance between the floating conductive layer and the first planar conductor is about 2.5% to about 12.5% less than a distance between the floating conductive layer and the second planar conductor, along the axis.

15. An isolated micro-scale passive device configured to be disposed on a substrate comprising an upper surface, the isolated micro-scale passive device comprising:
a first planar conductor;
a second planar conductor configured to be disposed between the first planar conductor and the substrate; and
means for reducing a maximum electric field between the first planar conductor and the second planar conductor
means for substantially balancing a first capacitance of the isolated micro-scale passive device with a second capacitance of the isolated micro-scale passive device, wherein:
the first capacitance comprises:
a capacitance between the floating conductive layer and the second planar conductor; and
a capacitance between the floating conductive layer and the substrate; and
the second capacitance comprises a capacitance between the floating conductive layer and the first planar conductor.

16. The isolated micro-scale passive device of claim 15, wherein isolated micro-scale passive device comprises a transformer;

the first planar conductor comprises a first planar coil of the transformer; and the second planar conductor comprises a second planar coil of the transformer.

17. The isolated micro-scale passive device of claim 16, wherein:

the means for reducing the maximum electric field between the first planar conductor and the second planar conductor comprises a floating conductive layer in an insulator layer; and the floating conductive layer comprises a slotted planar conductor.

18. The isolated micro-scale passive device of claim 15, wherein isolated micro-scale passive device comprises a capacitor;

the first planar conductor comprises a first plate of the capacitor; and the second planar conductor comprises a second plate of the capacitor.

19. The isolated micro-scale passive device of claim 18, wherein:

the means for reducing the maximum electric field between the first planar conductor and the second planar conductor comprises a floating conductive layer in an insulator layer; and the floating conductive layer comprises a continuous planar conductor.

20. The isolated micro-scale passive device of claim 15, wherein the means for reducing the maximum electric field between the first planar conductor and the second planar conductor comprises a floating conductive layer encapsulated by an insulator layer.

* * * * *